Aug. 1, 1939.   G. BUNAU-VARILLA   2,168,108
AUTOMOBILE VEHICLE
Filed Nov. 8, 1937
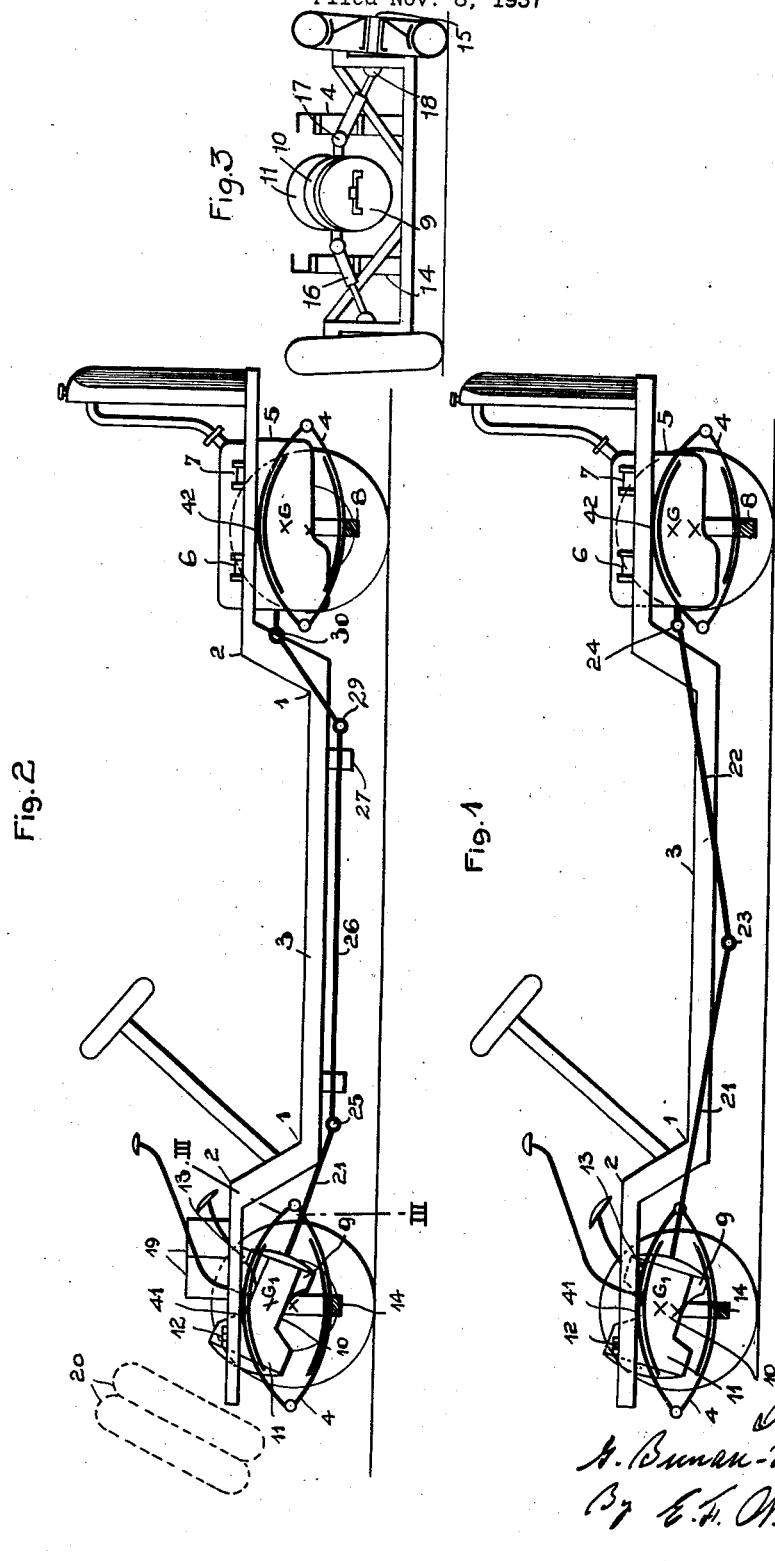

Patented Aug. 1, 1939

2,168,108

UNITED STATES PATENT OFFICE 2,168,108

AUTOMOBILE VEHICLE

Guy Bunau-Varilla, Paris, France

Application November 8, 1937, Serial No. 173,507
In France November 17, 1936

5 Claims. (Cl. 180—70)

The present invention relates to automobile vehicles.

One of the objects of the invention is to provide an automobile vehicle in which the suspended mass tends, when the vehicle is turning a corner, to be inclined toward the center of the curve along which the vehicle is running.

Another object of the invention is to provide an automobile vehicle in which the shaft tending to transmit the movement to the driving wheels does not constitute an obstacle to the lowering of the floor.

With these objects in view, while dividing the power mechanism of the vehicle (this expression including the engine, the elements cooperating therewith, such as the clutch, the gear box and the differential) into two groups, preferably of respective weights as equal as possible, fixed to the respective ends of the chassis frame. I secure one of these two groups or both to the chassis frame of the vehicle at points located above their respective centers of gravity, while leaving their lower parts wholly free.

According to another feature of the present invention, the transmission shaft consists of several portions, connected together by means of universal joints, in such manner that this composite shaft forms a broken line passing under the floor of the vehicle, no matter how low this floor is positioned.

Other features of the present invention will result from the following detailed description of some specific embodiments thereof.

Preferred embodiments of the present invention will be hereinafter described, with reference to the accompanying drawing, given merely by way of example and in which:

Fig. 1 is an elevational view of a first embodiment;

Fig. 2 is an analogous view of another embodiment of the invention;

Fig. 3 is a transverse sectional view on the line III—III of Fig. 1;

The chassis frame of the vehicle is of the upswept kind, that is to say the longitudinal members are bent upwardly at 1, near their ends, said ends being themselves horizontal but located in planes higher than that of the intermediate part 3, the level of which corresponds to that of the floor of the vehicle. The suspension system of the vehicle consists of elliptic springs 4, fixed at 41, 42, through their upper parts, to the outer ends of the longitudinal members of the chassis frame, respectively.

The power mechanism of the vehicle is divided into two groups. One of these groups includes the engine 5 and the mechanisms associated therewith. It is fixed at 6, 7 to the upswept end of the chassis frame, in such manner that its center of gravity G is located below the points of fixation of the rear springs to the longitudinal side members, at 42, and substantially in a vertical plane passing through the rear axle 8. Said axle is suitably bent between the wheels so as to permit displacements of the engine in the vertical direction, when the springs are being deformed. The lower part of the engine is left entirely free.

The other group includes clutch 9, gear box 10 and differential 11. These three mechanisms are associated together so as to constitute a single unit, which is fixed, at 12, 13, to the upswept front end of the longitudinal side members of the chassis frame, in such manner that the center of gravity $G^1$ of this second group is located below the points of fixation 41 of the front springs, and substantially in a vertical plane passing through the front axle 14.

The front wheels are driving wheels. Also they are adapted to pivot about vertical axes so as to permit of steering the vehicle. Their axle 14 is fixed to the lower branch of the corresponding springs. It is bent at its ends, as shown by Fig. 3, so as to bring the stub axles 15 of the wheels to the level of the articulations of the two branches of each spring to each other. These stub axles are coupled to the respective driven shaft elements of differential 11 through slide shafts 16 of a known type, extending between the branches of each spring, respectively. The ends of shafts 16 are connected with those of the shaft elements of the differential and with the stub axles through Cardan joints 17, 18. However, the coupling of these shafts 16 with the stub axles preferably takes place through a homokinetic coupling element so as to permit the pivoting displacements of the front wheels for steering purposes.

According to an essential feature of the present invention, the respective weights of the rear group (including the engine and its accessories) and of the front group (including the clutch, the gear box, and the differential) are equal or substantially so. If the second group is substantially tool light, an approximative equilibrium can be restored by placing at the front of the chassis frame the batteries of the vehicle, shown at 19, and the spare wheel or wheels 20 thereof.

The front unit 9—10—11 is inclined in a rearward direction, in such manner that the element of transmission shaft 21 which is directly connected therewith can pass under the floor of the vehicle. This shaft element is connected to the engine shaft through another shaft element 22 inclined in the opposite direction, so that said second shaft element can also pass under the floor of the vehicle.

In the embodiment illustrated by Fig. 2, the shaft element 21, which, in this case also, is inclined in the reaward direction, has its lower end connected through a homokinetic coupling 25 with another shaft element 26 mounted in horizontal position under the floor of the vehicle and supported in bearings 27. This last mentioned shaft element is coupled with the engine shaft through a third shaft element, with the interposition of universal joints 29, 30.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the accompanying claims.

What I claim is:

1. An automobile vehicle which comprises, in combination, a chassis frame, front and rear wheels supporting said chassis frame, a power mechanism consisting of a plurality of cooperating elements, including an internal combustion engine, the whole being divided into two distinct groups of elements of substantially equal respective weights, forming two separate power units, respectively, said chassis frame being of the upswept type, means for rigidly securing the upper part of the unit which includes the engine, above the center of gravity of said unit, to one end of said chassis-frame, with the lower part of said power unit unconnected with said frame, means for rigidly securing the upper part of the other power unit, above the center of gravity thereof, to the other end of said chassis-frame, with the lower part of said second mentioned unit unconnected with said frame, drive means for operatively connecting the second mentioned power unit with the wheels supporting the corresponding end of said chassis-frame, and drive means for interconnecting said two power units including a plurality of shaft elements forming a downwardly convex broken line the intermediate part of which is below the central part of the chassis frame, and universal coupling means for connecting each shaft element to the next one.

2. An automobile vehicle which comprises, in combination, a chassis frame with upswept ends, front and rear wheels supporting said chassis frame, a power mechanism consisting of a plurality of cooperating elements, including an internal combustion engine, the whole being divided into two distinct groups of elements of substantially equal respective weights, forming two separate power units, respectively, means for rigidly securing the upper part of the power unit which includes said engine, above the center of gravity of said unit, to one end of said chassis-frame, with the lower part of said power unit unconnected with said frame, means for rigidly securing the upper part of the other power unit, above the center of gravity thereof, to the other end of said chassis-frame, with the lower part of said second mentioned power unit unconnected with said frame, this second mentioned power unit being thus held in such position with respect to the chassis-frame to be inclined downwardly toward the central part of said vehicle, a shaft element coupled with said second mentioned power unit in line therewith so as to be similarly inclined, a shaft for said engine, and at least one shaft element, with universal coupling means at the respective ends thereof, interposed between the two first mentioned shafts, the lower part of the first mentioned shaft element being located below the central part of said chassis-frame, and drive means for operatively connecting the second mentioned power unit with the wheels supporting the corresponding end of said chassis-frame.

3. An automobile vehicle which comprises, in combination, a chassis frame with upswept ends, front and rear wheels supporting said chassis frame, a power mechanism consisting of a plurality of cooperating elements, including an internal combustion engine, the whole being divided into two distinct groups of elements of substantially equal respective weights, forming two separate power units, respectively, means for rigidly securing the upper part of that of said power units which includes said engine, above the center of gravity of said unit, to one end of said chassis-frame, with the lower part of said power unit unconnected with said frame, means for rigidly securing the upper part of the other power unit, above the center of gravity thereof, to the other end of said chassis-frame, with the lower part of said second mentioned power unit unconnected with said frame, this second mentioned power unit being held in such position with respect to said chassis-frame as to be inclined downwardly toward the central part of said vehicle, a shaft element directly coupled with said second mentioned power unit in line therewith so as to be similarly inclined, a shaft for said engine, and a shaft element, with universal coupling means at the respective ends thereof, interposed between the first mentioned shaft element and the engine shaft, the adjoining lower ends of said two shaft elements being located below the central part of said chassis-frame, and drive means for operatively connecting the second mentioned power unit with the wheels supporting the corresponding end of said chassis-frame.

4. An automobile vehicle which comprises, in combination, a chassis frame with upswept ends, front and rear wheels supporting said chassis frame, a power mechanism consisting of a plurality of cooperating elements, including an internal combustion engine, the whole being divided into two distinct groups of elements of substantially equal respective weights, forming two separate power units, respectively, means for rigidly securing the upper part of the power unit which includes said engine, above the center of gravity of said unit, to one end of said chassis-frame, with the lower part of said power unit unconnected with said frame, means for rigidly securing the upper part of the other power unit, above the center of gravity thereof, to the other end of said chassis-frame, with the lower part of said second mentioned power unit unconnected with said frame, this second mentioned power unit being held in such position with respect to said chassis-frame as to be inclined downwardly toward the central part of said vehicle, a shaft element directly coupled with said second mentioned power unit in line therewith so as to be similarly inclined, a horizontal shaft element journalled under said chassis-frame, universal coupling means for connecting said two shaft elements together, a shaft for said engine, and an inclined shaft element, with universal coupling means at the respective ends thereof, interposed between said horizontal shaft element and said engine shaft, and drive means for operatively connecting the second mentioned power unit with the wheels supporting the corresponding end of said chassis frame.

5. An automobile vehicle which comprises, in combination, a chassis-frame with upswept ends, front and rear wheels supporting said chassis-frame, a power mechanism consisting of a plurality of cooperating elements, including an internal combustion engine, the whole being divided into two distinct groups of elements of substantially equal respective weights, forming two separate power units, respectively, means for rigidly securing the upper part of the power unit which includes said engine, above the center of gravity of said unit, to one end of said chassis-frame, with the lower part of said power unit unconnected with said frame, means for rigidly securing the upper part of the other power unit, above the center of gravity thereof, to the other end of said chassis-frame, with the lower part of said second mentioned power unit unconnected from said frame, drive means for interconnecting said two power units, elliptic springs interposed between said chassis-frame and said wheels, and telescopic shafts interconnecting said second mentioned power unit with the respective wheels supporting the corresponding end of said chassis frame, said telescopic shafts passing through said elliptic springs.

GUY BUNAU-VARILLA.